US011069053B2

(12) United States Patent
Horowitz et al.

(10) Patent No.: US 11,069,053 B2
(45) Date of Patent: Jul. 20, 2021

(54) SYSTEMS AND METHODS FOR OPTICAL MATERIAL CHARACTERIZATION OF WASTE MATERIALS USING MACHINE LEARNING

(71) Applicant: AMP Robotics Corporation, Louisville, CO (US)

(72) Inventors: Matanya B. Horowitz, Golden, CO (US); James A. Bailey, Boulder, CO (US)

(73) Assignee: AMP Robotics Corporation, Louisville, CO (US)

( * ) Notice: Subject to any disclaimer, the term of this patent is extended or adjusted under 35 U.S.C. 154(b) by 209 days.

(21) Appl. No.: 16/177,137

(22) Filed: Oct. 31, 2018

(65) Prior Publication Data

US 2019/0130560 A1    May 2, 2019

Related U.S. Application Data

(60) Provisional application No. 62/580,720, filed on Nov. 2, 2017.

(51) Int. Cl.
*G06T 7/00* (2017.01)
*G06N 3/08* (2006.01)
(Continued)

(52) U.S. Cl.
CPC .......... *G06T 7/0008* (2013.01); *B25J 9/0093* (2013.01); *G06K 9/00771* (2013.01);
(Continued)

(58) Field of Classification Search
CPC ....... G06T 7/0004; G06T 7/0008; G06T 7/70; B25J 9/0093; G06K 9/00771; G06K 9/6254; G06N 3/08; G06N 5/046
See application file for complete search history.

(56) References Cited

U.S. PATENT DOCUMENTS 6,272,230 B1 * 8/2001 Hiraoglu ............... G01V 5/005
250/363.04
7,449,655 B2 * 11/2008 Cowling ............... B07C 5/3425
209/577
(Continued)

FOREIGN PATENT DOCUMENTS

JP          5433182            3/2014
JP          5433182 B2 *       3/2014
WO      2014179667 A2        11/2014

OTHER PUBLICATIONS

Sathish Paulraj Gundupalli , Subrata Hait, Atul Thakur; "Multi-material classification of dry recyclables from municipal solid waste based on thermal imaging"; Elsevier, Sep. 23, 2017.*
(Continued)

*Primary Examiner* — Shaghayegh Azima
(74) *Attorney, Agent, or Firm* — Van Pelt, Yi & James LLP

(57) ABSTRACT

Systems and methods for optical material characterization of waste materials using machine learning are provided. In one embodiment, a system comprises: an imaging device configured to generate image frames an area and target objects within the area; an object characterization processor coupled to the imaging device and comprising Neural Processing Units and a Neural Network Parameter Set. The Neural Network Parameter Set stores learned parameters utilized by the one or more Neural Processing Units for characterizing the one or more target objects. The Neural Processing Units are configured by the Neural Network Parameter Set to detect a presence of a plurality of different materials within the image frames based on a plurality of different features. For a first image frame of the plurality of image frames, the Neural Processing Units outputs material characterization data that identifies which of the plurality of different materials are detected in the first image frame.

33 Claims, 10 Drawing Sheets

(51) Int. Cl.
*B25J 9/00* (2006.01)
*G06T 7/70* (2017.01)
*G06N 5/04* (2006.01)
*G06K 9/00* (2006.01)
*G06K 9/62* (2006.01)

(52) U.S. Cl.
CPC ............ *G06K 9/6254* (2013.01); *G06N 3/08* (2013.01); *G06N 5/046* (2013.01); *G06T 7/70* (2017.01)

(56) References Cited

U.S. PATENT DOCUMENTS

| | | | | |
|---|---|---|---|---|
| 9,050,719 | B2* | 6/2015 | Valpola | B25J 13/085 |
| 9,977,965 | B1* | 5/2018 | Parikh | G06K 9/00664 |
| 2008/0004798 | A1* | 1/2008 | Troxler | G08B 21/023 |
| | | | | 702/187 |
| 2011/0251865 | A1* | 10/2011 | Yuen | G06Q 10/087 |
| | | | | 705/7.11 |
| 2013/0028487 | A1* | 1/2013 | Stager | B07C 5/342 |
| | | | | 382/110 |
| 2014/0224905 | A1* | 8/2014 | McKee | B02C 23/20 |
| | | | | 241/18 |
| 2014/0379588 | A1* | 12/2014 | Gates | G06Q 10/30 |
| | | | | 705/308 |
| 2015/0066214 | A1* | 3/2015 | Vaughn | G05B 19/042 |
| | | | | 700/275 |
| 2015/0073864 | A1* | 3/2015 | Labrie | G06Q 10/06 |
| | | | | 705/7.29 |
| 2015/0254532 | A1* | 9/2015 | Talathi | G06K 9/66 |
| | | | | 382/156 |
| 2016/0247176 | A1* | 8/2016 | Dumas | G06Q 30/0206 |
| 2017/0337271 | A1* | 11/2017 | Lee | G06K 9/6215 |
| 2018/0243800 | A1* | 8/2018 | Kumar | G06N 20/00 |
| 2018/0353886 | A1* | 12/2018 | Choi | C03C 1/002 |
| 2019/0017982 | A1* | 1/2019 | Lamberti | G01N 21/359 |
| 2020/0029502 | A1* | 1/2020 | Hultgren | B65G 33/14 |

OTHER PUBLICATIONS

Tuomas J. Lukka, Timo Tossavainen, Janne V. Kujala, and Tapani Raiko; "ZenRobotics Recycler—Robotic Sorting using Machine Learning"; sensor based sorting, 2014.*

Gundupalli et al., "A Review on automated sorting of source-separated municipal solid waste for recycling", Waste Management, Sep. 20, 2016, pp. 56-74, Elsevier Ltd.

International Searching Authority, "Invitation to Pay Additional Fees from PCT Application No. PCT/US2018/058552 dated Feb. 14, 2019", from Foreign Counterpart to U.S. Appl. No. 16/177,137, pp. 1-18, Published: WO.

Lukka et al., "ZenRobotics Recycler—Robotics Sorting using Machine Learning", Sensor Based Sorting, 2014, pp. 1-8, ZenRobotics Ltd.

CrowdFlower; "What We Learned Labeling 1 Million Images A practical guide to image annotation for computer vision"; pp. 1-15; Published by CrowdFlower.

Huang, Jonathan et al. "Speed/accuracy trade-offs for modern convolutional object detectors"; OPen Access version, provided by the Computer Vision Foundation; Published by IEEE Xplore; pp. 7310-7319; Nov. 30, 2016.

Kingma, Diederik P., et al. "Adam: A Method for Stochastic Optimization"; Published as a conference paper at ICLR 2015; pp. 1-15; Jan. 30, 2017.

McCoy John C. Jr, et al. "Systems and Methods for Robotic Suction Grippers"; U.S. Appl. No. 62/561,400, filed Sep. 21, 2017; pp. 1-34; Published: US.

International Searching Authority, "International Search Report and Written Opinion from PCT Application No. PCT/US2018/058552 dated Apr. 8, 2019", from Foreign Counterpart to U.S. Appl. No. 16/177,137, pp. 1-22, Published: WO.

* cited by examiner

SYSTEMS AND METHODS FOR OPTICAL MATERIAL CHARACTERIZATION OF WASTE MATERIALS USING MACHINE LEARNING

CROSS-REFERENCE TO RELATED APPLICATIONS

This U.S. Patent Application claims priority to, and the benefit of, U.S. Provisional Patent Application No. 62/580,720 titled "SYSTEMS AND METHODS FOR OPTICAL MATERIAL CHARACTERIZATION OF WASTE MATERIALS USING MACHINE LEARNING" filed on Nov. 2, 2017, which is incorporated herein by reference in its entirety.

BACKGROUND

Within many industrial facilities, objects are transported on conveyor belts from one location to another. Often a conveyor belt will carry an unsorted mixture of various objects and materials. In some instances, like within recycling and waste management facilities for example, some of the objects may be considered desirable (e.g. valuable) materials while others may be considered undesirable contaminants. For example, the random and unsorted contents of a collection truck may be unloaded at the facility onto a conveyor belt. At that point the facility operator does not really know specific details about the types of material that have just been received. The facility operator may therefore wish to be able to identify what material is being carried on the conveyor belt in order to gather data about the type of material being conveyed, and/or to identify target material for removal from the conveyor belts such as by a sorting robot. Although sorting personnel may be stationed to manually sort and catalog materials as it is transported on the belt, the use of sorting personnel is limiting because they can vary in their speed, accuracy and efficiency and can suffer from fatigue over the period of a shift.

For the reasons stated above and for other reasons stated below which will become apparent to those skilled in the art upon reading and understanding the specification, there is a need in the art for systems and methods for optical material characterization of waste materials using machine learning.

SUMMARY

The embodiments of the present disclosure provide methods and systems for optical material characterization of waste materials using machine learning and will be understood by reading and studying the following specification.

In one embodiment, an optical material characterization system comprises: at least one imaging device configured to generate image frames that capture an image of an area and one or more target objects within the area; an object characterization processor coupled to the at least one imaging device and comprising one or more Neural Processing Units and a Neural Network Parameter Set, wherein the Neural Network Parameter Set stores learned parameters utilized by the one or more Neural Processing Units for characterizing the one or more target objects; wherein the one or more Neural Processing Units are configured by the Neural Network Parameter Set to detect a presence of a plurality of different materials within the image frames based on a plurality of different features; and wherein for a first image frame of the plurality of image frames, the one or more Neural Processing Units outputs material characterization data that identifies which of the plurality of different materials are detected in the first image frame.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

In many industrial facilities such as recycling and/or other waste sorting facilities, materials are often transported via conveyer belts as various sorting machinery segregates the waste materials based on various criteria such as material type. For example, an initial material intake conveyer belt may transport a collection of mixed waste including, for example, glass, plastics and cardboard objects. Sorting machinery, as the waste material is conveyed, may be used to selectively sort and transfer different objects to different parts of the facility based on their material type. For example, glass bottles may be segregated and transported to a different part of the facility that plastic milk containers. Although waste products travelling on a conveyer belt are used as example target objects in the example embodiments described herein, it should be understood that in alternate implementations of these embodiments, the target objects need not be waste materials but may comprise and type of material for which it may be desired to sort and/or segregate. Moreover, although a conveyer belt is used as an example conveyance mechanism for transporting the target objects within reach of the suction gripper, it should be understood that in alternate implementations of these embodiments, other conveyance mechanism may be employed. For example, for any of the embodiments described below, in place of an active conveyance mechanism such as conveyor belt, an alternate conveyance mechanism may comprise a chute, slide or other passive conveyance mechanism through and/or from which material tumbles, falls, or otherwise is gravity fed as it passes by the imaging device.

Figure 1:
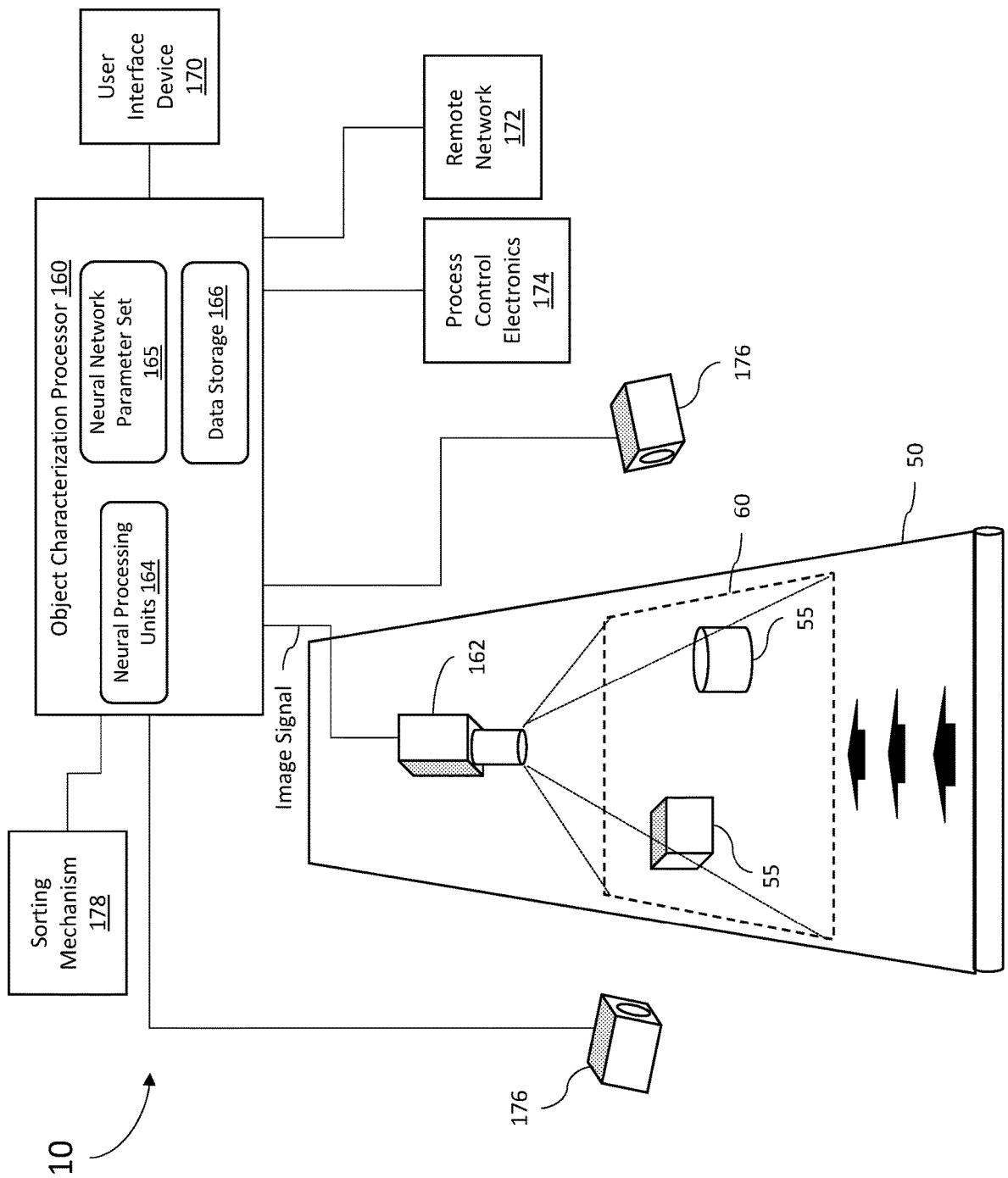
FIG. 1 is a diagram illustrating an optical material characterization system of one embodiment of the present disclosure.

FIG. 1 is a diagram illustrating an optical material characterization system 10 of one embodiment of the present disclosure. As shown in FIG. 1, the optical material characterization system 10 comprises at least one imaging device 162 directed at a conveyer belt 50 which transports one or more target objects (shown at 55). In some embodiments the imaging device 162 comprises a camera sensor that captures visual spectrum images of the target objects 55 carried by the conveyor belt 50. In other embodiments, the imaging device 162 may also, or instead, comprise infrared (IR) and/or ultraviolet (UV) sensors that capture IR and/or UV images of the target objects 55. As such, the imaging device 162 may comprise visual spectrum, IR, or UV sensors, or some combination thereof. It should also be appreciated that the imaging device 162 may instead, or further, comprise other types of sensors that may be used to generate an image, such as but not limited to a magnetic sensor or a hyperspectral image sensor. In the embodiment shown in FIG. 1, the imaging device 162 functions as an area sensor that captures a two dimensional image (also referred to herein as an image "frame") of an area 60 of the conveyer belt 50, along with any objects 55 that are within that area 60. In other embodiments, the imaging device 162 may comprise a line scanner that captures a strip or slice of the conveyer belt 50 and its contents. These image strips may then be digitally spliced to generate a composite image frame of area 60.

The imaging device 162 is in communication with an object characterization processor 160 that comprises one or more Neural Processing Units 164 and a Neural Network Parameter Set 165 (which stores learned parameters utilized by the Neural Processing Units 164). In some embodiments, the imaging device may also comprise a Data Storage 166 that stores the raw images received from the imaging device 162, processed images comprising labeled data, and may further be used to store other data such as material characterization data generated by the Neural Processing Units 164. The Neural Network Parameter Set 165 and Data Storage 166 may either be implemented together on a common physical non-transient memory device, or on separate physical non-transient memory devices. In some embodiments, the Data Storage 166 may comprise a random access memory device, or removable storage media.

For some embodiments, the resulting material characterization data output stored by the object characterization processor 160 (which in some embodiments may be stored to the data storage 166) may comprise a tally of what different materials are present in the image frame. In some embodiments, as further described below, the resulting material characterization data may further provide how many objects of each material type are present in the image frame and/or the location of the identified objects within the frame. For example, the material characterization data may indicate that there are 3 aluminum cans within the image frame and provide coordinates for the geometric center of each can and/or an estimate of certain identified features such as the shape and/or dimensions of the object. In some embodiments, the object characterization processor 160 outputs one or more physical object attributes determined by the one or more Neural Processing Units based on visional inspection of the one or more target objects The object characterization processor 160 as shown in FIG. 1 is implemented as a discrete physical device comprising processing electronics separate from those of the imaging device 162. In that case, the object characterization processor 160 would receive the image signals from the imaging device 162 via a wired or wireless communication link. Alternatively, the imaging device 162 and object characterization processor 160 may be integrated into a single physical electronics device and comprise the processors, memory and other electronics to implement the embodiments described herein. In various embodiments, the object characterization processor 160 may be implemented using a microprocessor coupled to a memory that is programed to execute code to carry out the functions of the object characterization processor 160 described herein. In other embodiments, the object characterization processor 160 may additionally, or alternately, be implemented using an application specific integrated circuit (ASIC) or field programmable gate array (FPGA) that has been adapted for machine learning.

As shown in FIG. 1, the object characterization processor 160 may further be coupled to at least one user interface device 170 (which may comprise a display and/or user input interface such as a keyboard and/or touchscreen, for example), a remote network 172 and/or process control electronics 174. In some embodiments, the user interface device 170 provides a user access to the Data Storage 166 so that a user may monitor images captured by the imaging device 162 and associated material characterization data generated by the object characterization processor 160. Where Data Storage 166 comprises a removable storage media, that media may be inserted into a separate user terminal and similarly reviewed by a user. In some embodiments, the object characterization processor 160 may transmit the contents of the data storage 166 to one or more remote storage devices connected to the remote network 172 (via either wired or wireless network connections) or to a remote user interface device 170 (via either wired or wireless network connections) to provide access to the images and material characterization data.

As also shown in FIG. 1, the optical material characterization system 10 may comprise one or more light sources 176 controlled by the object characterization processor 160 to illuminate the target objects 55 within the area 60 of the conveyer belt 50 as the imaging device 162 captures images of area 60 and its contents. In some embodiments, the object characterization processor 160 selectively controls separate light sources 176 that illuminate area 60 from different angles. Alternately, separate light sources 176 may selectively illuminate the area 60 and its contents using different spectrums and/or wavelengths of light, as further discussed below. In this way, the object characterization processor 160 may obtain from imaging device 162 multiple images of the same target object 55 under more than one lighting condition, which may provide data that can distinguish different materials from each other, or be used to enhance estimates of an object's size and dimensions, for example.

In operation the imaging device 162 is directed downward towards the conveyer belt 50 in order to capture an overhead view of the materials 55 being transported by the conveyer belt 50. The imaging device 162 produces an image signal that is delivered to the object characterization processor 160. Within the object characterization processor, these image frames are provided input to one or more neural network and artificial intelligence algorithms (shown as the Neural Processing Units 164) to locate and identify material appealing within the image frames.

Figure 2:
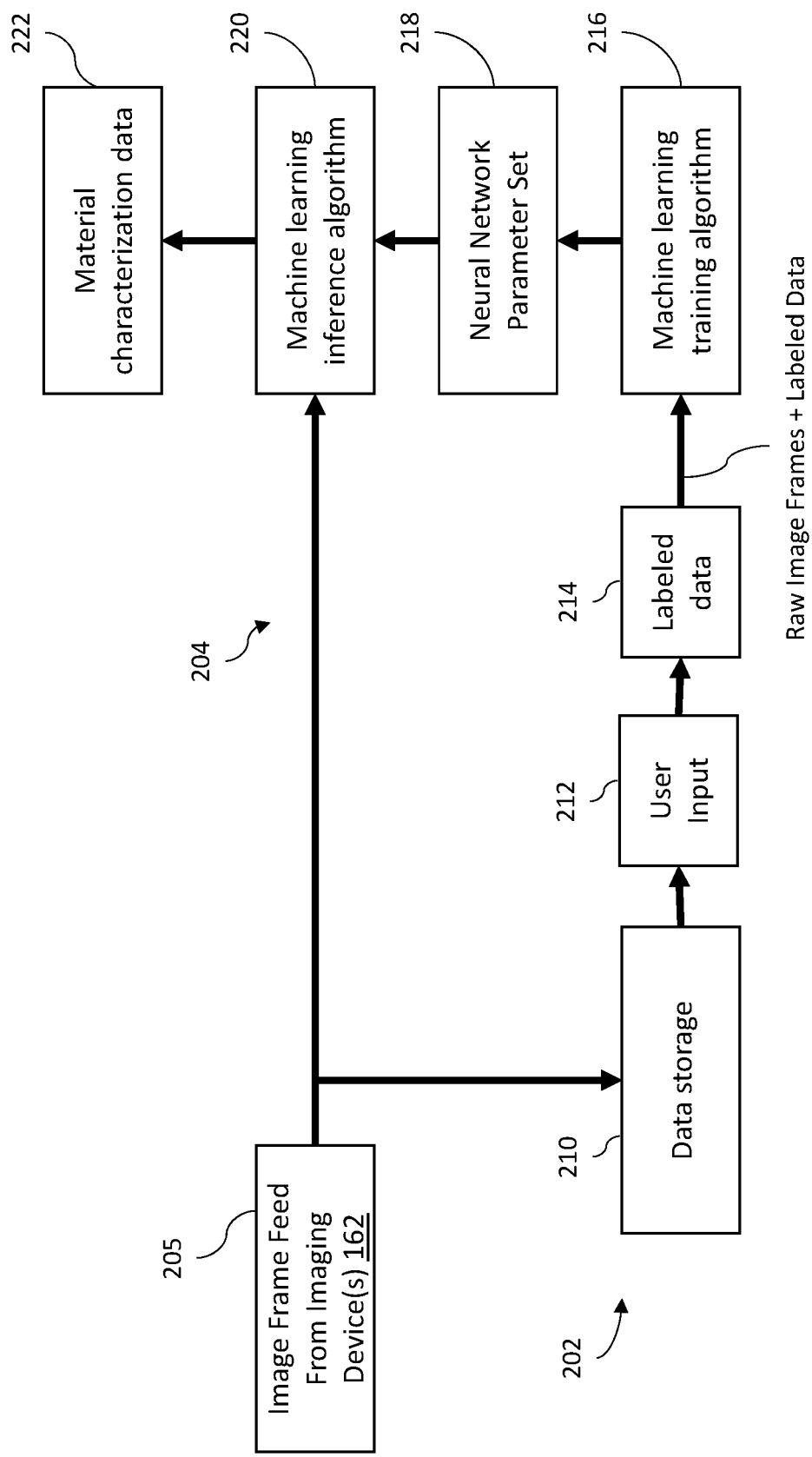
FIG. 2 is a diagram illustrating operation of neural processing units an object characterization processor of one embodiment of the present disclosure.

Referring to FIG. 2, the Neural Processing Units 164 executed within the object characterization processor 160 operate in two modes: 1) a machine learning training mode (shown generally at 202), and 2) a machine learning inference mode (shown generally at 204). Operating in the machine learning training mode, the Neural Processing Units 164 derive the Neural Network Parameter Set 165 which is then used by the Neural Processing Units 164 in the machine learning inference mode to produce the chmaterial characterization data.

As shown in FIG. 2, a feed of image frames captured by the imaging device 162 (shown at 205) is stored into the data storage 166 (shown at 210) to obtain a collection of image frames. For each of these stored image frames, a user (for example, using user interface display 170 or remotely connecting to the object characterization processor 160 via the remote network 172) manually reviews the image (shown at 212) to produce labeled data (shown at 214). This labeled data 214 is stored back into the data storage 166. To produce the labeled data 214, the user view a captured image frame and via a user interface identifies where objects 55 are present in the image fame (i.e., the objects location within the image) and what the objects are. For example, the user may point to or circle an object with the user interface and then tag the object with one of a predetermined set of labels based on what the user thinks the object is. For example, the user may visually identify a first object at a first position within in the image as being a plastic bottle, and therefore tag it with a "plastic bottle" label. The user may identify a second object at a second position within in the image as an aluminum can, and tag it with an "aluminum can" label. Further details regarding examples of the process of labeling images which may be used in the present embodiments may be found in the reference "WHAT WE LEARNED LABELING 1 MILLION IMAGES: A practical guide to image annotation for computer vision", CrowdFlower Inc., 2017, which is incorporated by reference in its entirety. When the user has completed identifying and tagging the objects in the image frame, the labeled data 214 is saved back into the data storage 166 and associated with the raw image frame reviewed by the user to create the labeled data 214.

Once the user can completed generating the labeled data 214 for a for the set of raw image frames, both the labeled data 214 and raw image frames are entered into a machine learning training algorithm 216 which encodes the information (for example, by defining a set of pixels for an object within the raw image frames as being the type material identified by the label with which it was tagged) and from that produce the Neural Network Parameter Set 165 (shown at 218) that teaches the Neural Processing Units 164 how to identify material in subsequent images that will be provided when operating in machine learning inference mode. In the machine learning training mode the Neural Network Parameter Set 165 is generated using the machine learning training algorithm 216 to produce an optimized set of parameters. The purpose of these parameters is to configure the Neural Processing Units 164 to make the same decision as the user made when producing the labeled data (though not necessarily for the same reasons). One of ordinary skill in the art would appreciate that there are a number of machine learning algorithms which may be utilized to implement the machine learning training algorithm 216. Therefore, the machine learning training algorithm 216 may comprise an algorithm, such as but not limited to Stochastic Gradient Descent (SGD), Adaptive Moment Estimation (ADAM), Root Mean Square Propagation (RMSProp), Nesterov's First Order Method, the Adaptive Gradient Algorithm (AdaGrad), and/or variants thereof that would be known to those of ordinary skill in the art. For example, for additional information regarding one of more of these algorithms which may be used in conjunction with the embodiments describer here, see Kingma et al., "ADAM: A METHOD FOR STOCHASTIC OPTIMIZATION", Proceedings of the 3rd International Conference for Learning Representations, San Diego, 2015, which is incorporated herein by reference in its entirety.

The output from the machine learning training algorithm 216 is the Neural Network Parameter Set 165 that allows the Neural Processing Units 164 to identify material in the image frames. In some embodiments, the parameters that comprise the Neural Network Parameter Set 165 are associated with various features of the imaged objects such as, but not limited to hues, texture, grain, reflectance, printed graphics, edges, corners, and so forth. In one embodiment, the Neural Processing Units 164 each comprise multiple processing layers (referred to a "neurons") such that each processing layer searches for a particular feature from the data. For example, hue may be one feature considered by a processing layer of the Neural Processing Units 164. If the target object has a hue within a first range of hues that has a high correlation with the hues of a milk carton, then that features weights in favor for the object being a milk carton. If the object in the image instead has a hue within a second range of hues that has a low correlation with the hues of a milk carton, then that features weights in favor of the object not being a milk carton. Such correlations would be determined using neural network parameters defined for the particular feature as stored in the Neural Network Parameter Set 165. Other processing layers within the Neural Processing Units 164 would look for correlations for other features of the object in the image frame. However, it should be noted that which features of the object are important to consider and/or work best for differentiating objects are determined during training of the Neural Processing Units 164 with the machine learning training algorithm 216.

Once the Neural Network Parameter Set 165 has been generated, the object characterization processor 160 and Neural Processing Units 164 may begin operation in the machine learning inference mode 204 in which the Neural Processing Units 164 is operating to detect materials within the image frame rather than learn. It should be noted that once a Neural Network Parameter Set 165 is generated, those parameters may be stored within and used by the same object characterization processor 160 and Neural Processing Units 164 which created them. Alternatively, the Neural Network Parameter Set 165 generated by one object characterization processor 160 may optionally be distributed and loaded for use onto another object characterization processor 160 expected to perform the same task as the object characterization processor 160 and Neural Processing Units 164 which created them under the same conditions.

During operation in machine learning inference mode (shown at 204), the feed of image frames 205 captured by the imaging device 162 is fed directly to the machine learning inference algorithm 220, where it is sequentially processed by each of the multiple processing layers, or neurons, of the Neural Processing Units 164 to evaluate the correlation of specific features with features of objects that it has previously learned.

Figure 3:
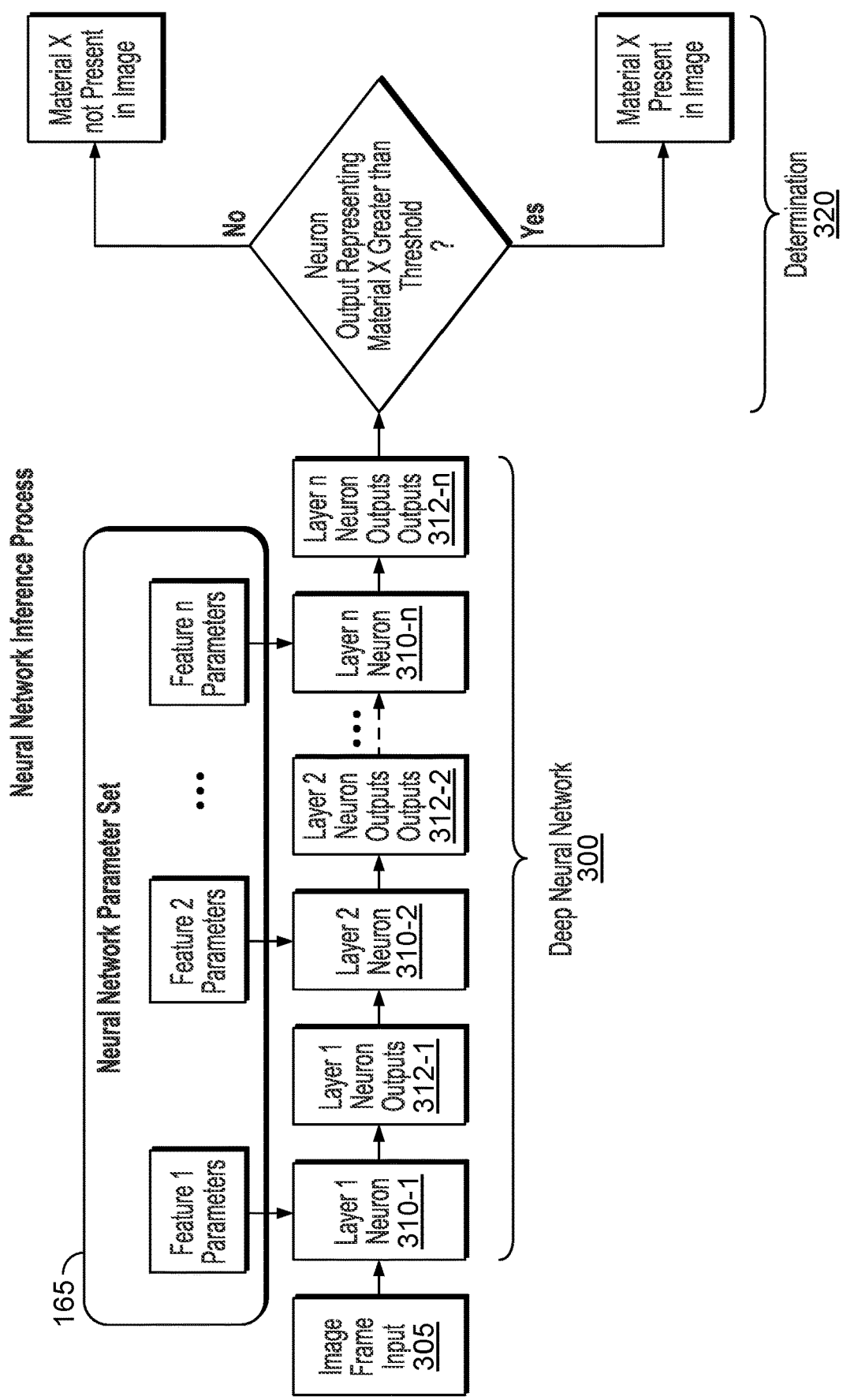
FIG. 3 is a diagram illustrating an example structure for one embodiment of a neural network of the neural processing units.

An example structure for one embodiment of a neural network of the Neural Processing Units 164 is illustrated generally at 300 in FIG. 3. As shown in FIG. 3 at 305, the image frame captured by the imaging device 162 into the first layer neuron 310-1. It should be appreciated that when an image frame is captured by the imaging device 162, a particular object may only partially appear within the frame and/or may straddle across consecutive frames. As such, imaging device 162 may be operated to selectively capture either overlapping or non-overlapping frame sequences. For example, because the speed at which objects 55 travel on the conveyor belt 50 is known and is typically constant, then the object characterization processor 160 can input two consecutive frames and calculate how much of one frame overlaps with the next to negate duplicative object data. Similarly, the object characterization processor 160 may discard captured image frames until a frame is captured that contains only new data. If some materials have not yet completely entered area 60, then characterization processor 160 may wait until those objects are entirely in-frame before processing an image frame.

The first layer neuron 310-1 is configured using the Neural Network Parameter Set 165 to detect a specific feature or combination of features. More specifically, the Neural Network Parameter Set 165 comprises a subset of parameters learned during the machine learning training mode that are associated with this first layer neuron 310-1 for the purpose of detecting this feature. The first layer neuron 310-1 generates a plurality of neuron outputs 312-1 that characterize the presence of that feature in the image frame 305. For example, if the feature evaluated by the first layer neuron 310 is hue, then the neuron outputs 312-1 may comprise outputs from multiple nodes of the first layer neuron 310-1, one output for each hue that the first layer neuron 310-1 is trained to detect. If the feature evaluated by the first layer neuron 310 is hue, then nodes of the neuron outputs 312-1 that are associated with any detected hues will go high. Nodes of the neuron outputs 312-1 not associated with detected hues will go low.

The neuron outputs from the first layer neuron 310-1 are fed as inputs to the second layer neuron 310-2 which, in the same way, evaluates the image frame for a different feature or combination of features. The neuron outputs 312-2 from the second layer neuron 310-2 are fed as inputs to the next neuron to produce neuron outputs, and the layers repeat so forth to neuron 310-$n$, each layer detecting a different feature or combination of features, and configured by a subset of parameters learned during the machine learning training mode that are associated with that layer neuron for the purpose of detecting that feature. The final neuron outputs 312-$n$ from the output neuron 310-$n$ each respectively represent a confidence level that a particular material is present in the image frame 305. In other words, the final output neuron 310-$n$ will comprise an output node for each of the possible materials that the Neural Processing Units 164 have learned, and output a value indicating a confidence level that the object comprises the material associated with that node. If an object in the image comprises an aluminum can, then a node of the output neuron 310-$n$ associated with aluminum cans should provide an output with a high confidence value. Meanwhile, the nodes of the output neuron 310-$n$ associated with other materials should provide an output with a low confidence value. In some embodiments, a confidence threshold is established to make the determination as to whether an object of a certain material is present in the image. This determination is shown at 320 in FIG. 3. For example, if a confidence threshold for aluminum cans is set for 0.5 and the output node from neuron 310-$n$ for aluminum cans outputs a value of 0.3, then the determination at 320 would conclude that no aluminum can is present in the processed image frame 305. Conversely, if the output node from neuron 310-$n$ for aluminum cans outputs a value of 0.6, then the determination at 320 would conclude that at least one aluminum can is present in the image frame. In some embodiments, the same confidence threshold may be used for all materials. In other embodiments, the confidence threshold for different materials may vary. For example, a confidence threshold used for silver, gold, or other precious (high value) materials may be set low (for example 0.1) as compared to lesser value materials, in order to ensure a greater chance that such materials are identified as present and do not proceed into the system undetected.

The process described in FIG. 3 may generally be referred to by those of skill in the art of machine learning as a "Classification" process because it processes the provided image frame in order to determine what material may be present in the image frame. In order to provide further details about the objects present in the image frame, such as the number of objects comprising each detected material, and the location, shape, orientation, and dimensions of these objects in the image frame, a "Segmentation" or similar process known to those in the art of machine learning may be used. Alternative algorithms to detect objects within an image include Fully Convolutional Neural Network, Multibox, Region-based Fully Convolutional Networks (R-FCN), Faster R-CNN, and other techniques commonly known to those skilled in the art as object detection, instance-aware segmentation, or semantic segmentation algorithms described in available literature. Further details regarding examples of the process of detecting objects in captured images which may be used in the present embodiments may be found in the reference Fluang et al., "Speed/accuracy trade-offs for modern convolutional object detectors" The IEEE Conference on Computer Vision and Pattern Recognition (CVPR), 2017, pp. 7310-7311, which is incorporated by reference in its entirety.

Figure 4:
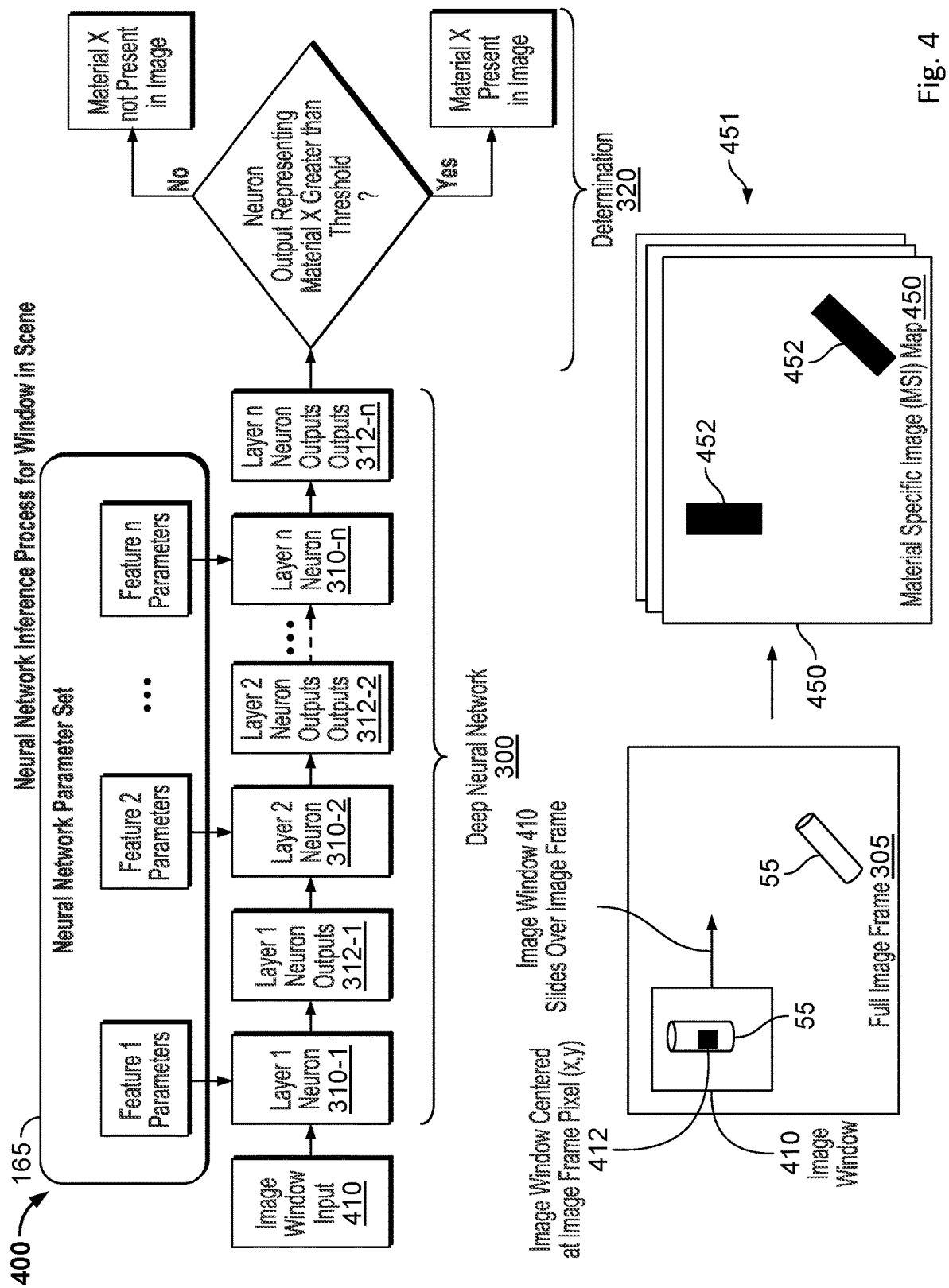
FIG. 4 is a diagram of a Fully Convolutional Neural Network of one embodiment of the present disclosure.

One such process is illustrated by the example embodiments shown in FIG. 4. FIG. 4 illustrates generally at 400 a Fully Convolutional Neural Network which may be referred to by those of skill in the art of machine learning as a "Machine Learning Based Segmentation Algorithm." In the process 400 shown in FIG. 4, as opposed to feeding the entirety of a captured image frame into the neural network 300 of the Neural Processing Units 164, a cropped image frame 410 (referred to herein as an "image window") comprising a portion of the full image frame captured by imaging device 162 is fed as the input to the segmentation process shown in FIG. 3. Moreover, the neural network 300 is trained to provide an output specifically indicating the material detected at a center pixel 412 of the image window 410 that corresponds to a pixel at location (x,y) of the full image frame. In other words, when the image window 410 is fed in as the input to the neural network 300, the neuron output 312-$n$ for a particular material will go high only if that material is detected as overlapping the center pixel 412 of the image window 410. In this way, the Neural Processing Units 164 can specifically identify that an object comprising that specific material is present at pixel location (x,y) of the full image frame. Then, by incrementally sweeping the position of the image window 410 over the entirety of the full image frame, feeding the image windows 410 at each increment into the neural network 300, each pixel location (x,y) of the full image frame in which an object that comprises that specific material is present can be identified to produce a composite material specific image (MSI) map 450 for that material. For example, assuming that the MSI map 450 shown in FIG. 4 applies to aluminum cans, then as the Neural Processing Units 164 detect that the material overlapping the center pixel 412 of the image window 410 is an aluminum can, then the corresponding pixel location in the MSI map 450 may be set to high. When the Neural Processing Units 164 detect that the material overlapping the center pixel 412 of the image window 410 is anything other than an aluminum can, then the corresponding pixel location in the MSI map 450 may be set to low. The resulting MSI map 450 will comprise a pattern of pixels set high (shown at 452) where aluminum cans have been determined to exists, further indicating their size an orientation. This same process may be simultaneously performed for each of the different material that the Neural Processing Units 164 is trained to detect as each image window 410 is processed so that multiple MSI maps 450 may be generated in parallel (shown at 451). For example, if the Neural Processing Units 164 is trained to detect 50 distinct materials, then 50 MSI maps 450 may be generated in parallel, each respective MSI map 450 dedicate to illustrating where a particular material, and thus a corresponding object 55, is present in the full image frame. The MSI maps 450 represent material characterization data that may be stored into the Data Storage 166 as described above, accessed by a user via a user interface display 170, transmitted to remote storage or a remote user interface display via a remote network 172, used to automatically activate or control other facility machinery via process control electronics 174, and/or provided as input used by other facility machinery such as a sorting robot (such as described by any of the embodiments disclosed in U.S. Provisional Patent Application No. 62/561,400, titled "SYSTEMS AND METHODS FOR ROBOTIC SUCTION GRIPPERS" and filed on Sep. 21, 2017, which is hereby incorporated by reference in its entirety) or air jet sorting mechanism or other sorting mechanism (shown at sorting mechanism 178). Although this specification describes specific examples, it should be noted that any of the Segmentation techniques known to those versed in the art may be used in alternated embodiments to generate the MSI maps discussed herein.

In some embodiments, rather than an MSI map 450 depicting where a particular material, and thus a corresponding object 55, is present in the full image frame, the MSI map 450 may be further defined based on a region of the object 55 that has a high correlation with a particular feature evaluated by the Neural Processing Units 164. For example, sorting mechanism 178 may be provided one or more MSI maps 450 by object characterization processor 160 in order to drive the sorting mechanism 178 to capture and remove objects appearing in those MSI maps. In some embodiments, the MSI maps 450 provided by object characterization processor 160 may be further refined to identify the specific surface areas of the identified objects having features that present the best surface for the gripper of the sorting mechanism 178 to attempt to grip. The gripper of the sorting mechanism 178 would have a higher probability of successfully capturing the object by gripping these surface areas of the identified objects as opposed to other areas. For example, where the sorting mechanism 178 comprises a suction gripper that it utilized to capture and remove target objects, the MSI maps 450 may highlight those pixel coordinates corresponding to regions having characteristics most easily captured using a suction gripper (for example, region of the object comprising a flat surface, or at least the flattest surface). In one embodiment, instead of an MSI map 450 for a given material having pixel set to high based on the Neural Processing Units 164 detecting that the material overlapping the center pixel 412 of the image window 410 comprises that given material, it would instead be set to high when the material overlapping the center pixel 412 of the image window 410 comprises that given material and presents the best surface on the target object for the sorting mechanism 178 to attempt to grasp to capture the target object. When the sorting mechanism 178 receives that MSI map 450, it will thus know not only which objects on the conveyor belt should be picked and removed, but the best location on the object for it to attempt to grasp using its gripper.

As mentioned above, illuminating target objects 55 using a diversity of light sources from different angles or using different spectrum may provide additional data which may be used to better differentiate different materials that may appear similar under standard lighting conditions. As such, in some embodiments the object characterization processor 160 controls the light sources 176 so that imaging device 162 captures multiple image frames of the objects 55 in area 60 in succession under different lighting conditions. For example, two or more light sources 176 may be flashed from different angles to generate images with different shadows for the same objects to provide contextual information that is used, for example, to determine the dimensions of a single object, or distinguish separate objects from each other. Alternately, the light sources 176 may illuminate the objects 55 using light comprising different wavelengths while imaging device 162 captures multiple image frames of the objects 55 in area 60 in succession. For example, the light sources 176 may switch between visible spectrum frequencies (such as red, blue, yellow). Further, the light sources 176 may switch between a first spectrum of visible light and a second spectrum of non-visible light. For example, some materials may emit a fluorescence under UV lighting that may distinguish them from other materials that look the same under visible light.

In such embodiments, the collection images frames for the set of objects 55 within area 60 under the different lighting conditions are considered collectively as the unit of data under which the Neural Processing Units 164 are trained, and the same lighting conditions are applied during the operation in machine learning inference mode. That is, the multiple raw image frames together with the associated labeled data generated in training mode would be entered as a single unit of data into the machine learning training algorithm for generation of the Neural Network Parameter Set 165. Moreover, during machine learning inference mode the object characterization processor 160 may selectively controls the light sources 176 based on input from a sensor, or based on a determination may be the Neural Processing Units 164. For example, the object characterization processor 160 may control the light sources 176 to illuminate the objects 55 in area 60 under a visible light spectrum under for steady state operation, but if the Neural Processing Units 164 detects the presence of a certain material, it then temporarily switches to a different second spectrum to obtain an additional image frame under. The additional image frame captured under the second spectrum may then be evaluated by the Neural Processing Units 164 to either confirm that the initial material determination was correct, or to more specifically differentiate and identify the material. In some embodiments such as described above, the Neural Processing Units 164 may comprise a first neural network to evaluate images captured under a first set of lighting conditions, and one or more additional neural network to evaluate images captured under respective additional lighting conditions.

Besides the control of lighting based on determinations made by the Neural Processing Units 164, the object characterization processor 160 may also control other automatic and/or real time processes based on the material characterization data. For example, the object characterization processor 160 may be coupled to process control electronics 174, which may comprise, for example, one or more actuators, servos, process controllers, lighting controls, and the like. For example, in some embodiments, the object characterization processor 160 may send a control signal to process control electronics 174 to adjust the operating speed of the conveyor belt 50 and/or actuate other machinery in the facility, to provide the location of a specific target object 55 to a sorting mechanism 178 to pick the material from the conveyor belt 50, or to activate alarms or warning indicators (for example, if an item of hazardous material has been detected). For example, in one embodiment, based on the material characterization data, the object characterization processor 160 recognizes that an object 55 comprising a predetermined material has been detected within the area 60. The object characterization processor 160 can then send material characterization data that comprises the coordinate information for the target object 55 to the sorting mechanism 178 to remove that object from the conveyor belt as described above. In other embodiments, the object characterization processor 160 may detect that too much, or not enough of, a specific material is being detected and operate process control electronics 174 to operate other machinery (such as other conveyor belts, or the operation of disc screen sorting devices) to increase or decrease the amount of those materials it is detecting.

Figure 5:
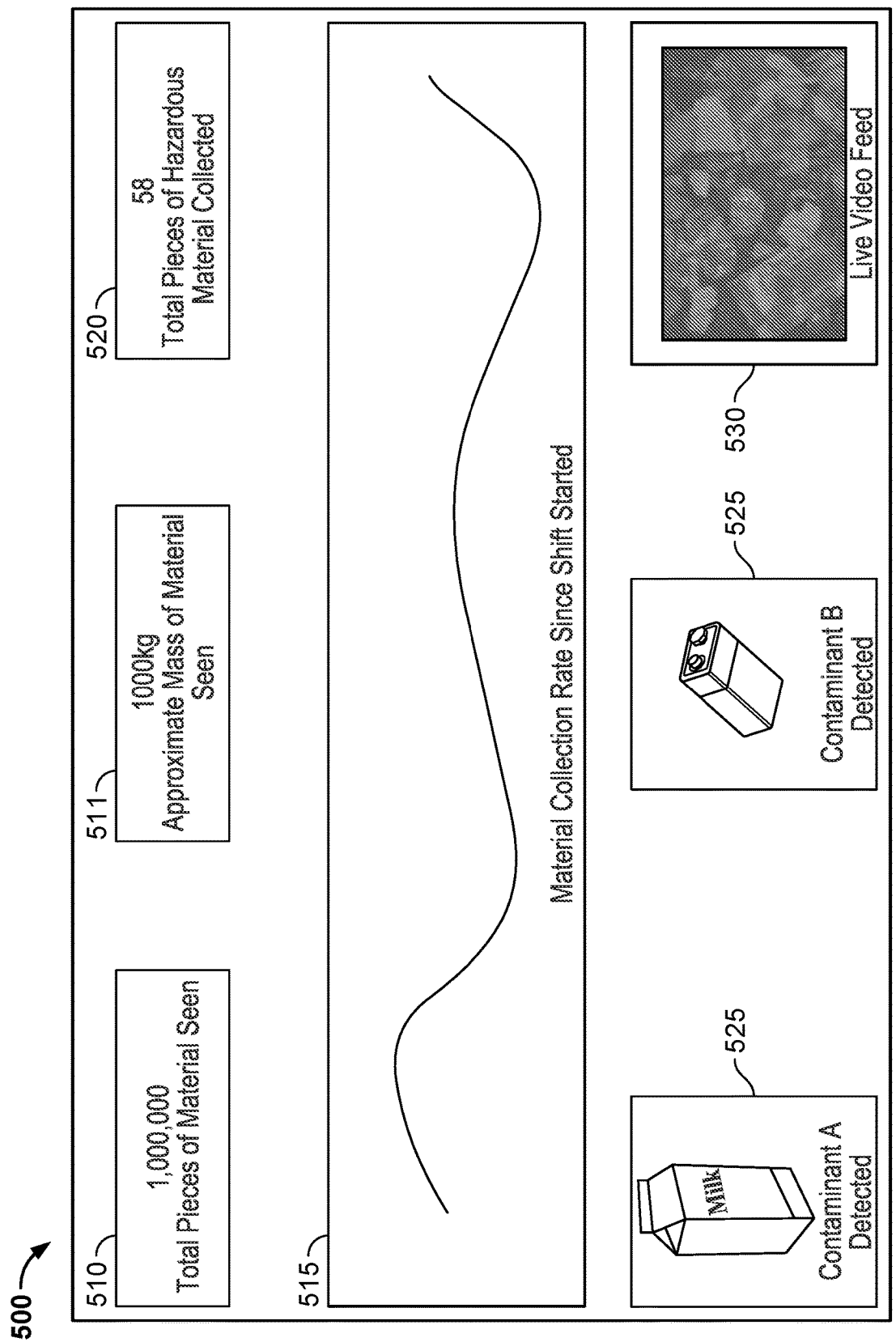
FIG. 5 is a diagram illustrating an example display of material characterization data at a user interface device for one embodiment of the present disclosure.

FIG. 5 is a diagram illustrating generally at 500 an example display of material characterization data at a user interface device for one embodiment of the present disclosure. This display is intended to provide only an example of the manner in which material characterization data, and statistics and other information derived from the material characterization data by the object characterization processor 160, may be generated and displayed. As such, FIG. 5 is not intended to be a limiting example. For example, at 510, statistics showing the cumulative total number of materials detected over a given period, and at 511 the estimated mass of those materials, may calculated by the object characterization processor 160. Estimated mass may be calculated, for example, by correlating the number of objects of each material type observed against a look-up table stored in the memory of object characterization processor 160 that provides a standard mass estimate for an item of that material. Moreover, the memory of object characterization processor 160 may be updated to include current market values for one or more of the materials detected so that the market value of that material collected by the facility and detected by the optical material characterization system 10 may be provided. In some embodiments, the displayed may be filtered to provide such statistics for specific materials. For example, the user may request the material characterization data for just aluminum cans over the past 24 hours. In that case, the display 500 may show information such as the total number of aluminum cans detected, an estimate of the total mass of aluminum cans detected, and the current market value for the aluminum cans detected. In some embodiments, material characterization data may be graphically displayed. For example, graphical data (shown at 515) may incrementally display the number of times a specific material has been detected over a previous time period. The object characterization processor 160 may also process the material characterization data to display statistics on hazardous material collected (shown at 520) or materials considered to be contaminant materials (shown at 525). In some embodiments, a live video feed of image frames from the imaging device 162 may be displayed (shown at 530).

Although the embodiments above each describe the optical material characterization system 10 operating in the context of a recycling and/or waste management facility, it should be appreciated that embodiments operating within the context of other facilities is expressly contemplated. For example, in one embodiment, the optical material characterization system 10 is implemented within the context of a facility that operates one or more anaerobic digesters. As would be appreciated by those skilled in the art, anaerobic digestion comprises a series of biological processes in which microorganisms break down biodegradable material in the absence of oxygen. The end product of this process may be used to produce biofuels, such as biogas, which may be combusted, for example to generate electricity and/or heat, or processed into renewable natural gas and transportation fuels. In one embodiment of the optical material characterization system 10, the conveyor belt 50 transports objects 55, which in this embodiment comprise food waste that serves as fuel to feed one or more anaerobic digestion vats in which anaerobic digestion takes place. In one such embodiment, the conveyor belt 50 may carry the food waste directly into the intake of an anaerobic digestion vat. The imaging device 162 captures images of the various objects 55 comprising food waste within area 60 and the object characterization processor 160 may be configured to detect and identify exactly what types of food waste will be entering the anaerobic digestion vat. Accordingly, the Neural Processing Units 164 will be trained and operated in both the machine learning training mode and machine learning inference mode described above in the same matter as described above to identify different materials. However, instead of having the neural network parameter set 165 trained to detect and distinguish recycled materials such as aluminum cans, cardboard, and milk jugs, it is instead trained to detect and distinguish different food waste materials. The object characterization processor 160 can then calculate and output an indication of the total available energy (for example, available BTU) that will be supplied to the anaerobic digestion vat by the food waste materials in that image frame. For example, the Neural Processing Units 164 may be trained to identify food waste materials such as banana peels, apple cores, or indeterminate food waste material such as generic brown sludge. Using the processes described above for operation in machine learning inference mode above, the Neural Processing Units 164 may analyze a captured image frame and identify the total mass respectively for each of the banana peels, apple cores, and generic brown sludge present on that section of the conveyor belt and reference data available in memory (e.g. a look-up table stored in the memory of object characterization processor 160) to retrieve BTU/unit mass multipliers for each of these materials. The total available BTU is then obtained by multiplying the detected mass for each food waste material by its corresponding multiplier and summing the results. In some embodiments, based on the determined total BTU, the object characterization processor 160 may output control signals (e.g. via process control electronics 174) to vary the operation of other facility equipment. For example, the based on the BTU availability provided by the food waste detected by the Neural Processing Units 164, the object characterization processor 160 may adjust the speed of the conveyor belt 50 to maintain, or converge on, a target BTU input rate. In other implementations, other external devices and process flows for operating the anaerobic digestion vat may be controlled based on the BTU availability and/or materials detected by the Neural Processing Units 164. For example, in one embodiment, if a contaminant is detected that would adversely affect operation of the anaerobic digestion vat, that material may be identified and diverted off of the conveyor feeding the anaerobic digestion vat by a sorting robot or other deice such as described above. In other embodiments, the conveyor belt 50 may not carry the food waste directly into the intake of an anaerobic digestion vat, but instead load storage silos that are subsequently used to feed the anaerobic digestion vat. In such an embodiments, the BTU availability provided by the food waste detected by the Neural Processing Units 164 may be used to regulate the loading of food waste into the silos based on the BTU of materials loaded rather than mass or weight. In one embodiment, once the target BTU for a silo is obtained, the object characterization processor 160 may provide a signal indicating such to plant equipment to realign the conveyor belt 50 to feed another silo. In this way, a more accurate measurement of the BTU available from a particular silo can be established. It should therefore be appreciated that in still other embodiments, characterization of conveyed objects for still other applications are expressly contemplated.

Figure 6:
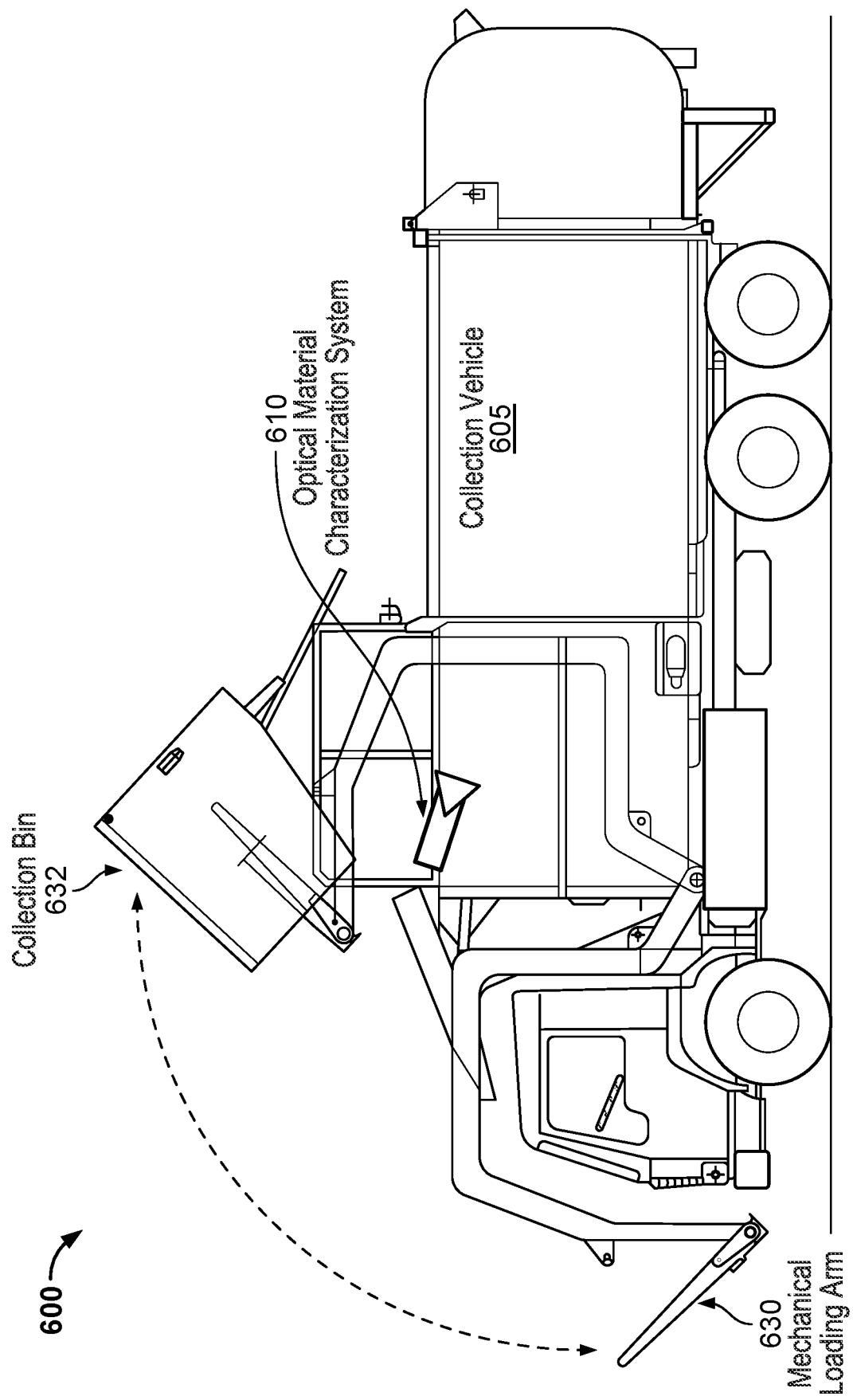
FIGS. 6, 7 and 7A is a diagram illustrating another optical material characterization system of one embodiment of the present disclosure.

FIG. 6 is a diagram illustrating generally at 600 another example implementation of the optical material characterization system 10 discussed above (which will now be referred to as optical material characterization system 610) adapted for use outside of a fixed facility, and instead implemented in a moving collection vehicle 605 such as, but not limited to, a waste collection truck. It should be understood that the features and elements described herein with respect to FIG. 1 may be used in conjunction with, in combination with, or substituted for elements of FIG. 6 and optical material characterization system 610, as well as any of the other embodiments discussed herein, and vice versa. Further, it should be understood that the functions, structures and other description of elements for embodiments described herein may apply to like named or described elements for any of the Figures and vice versa.

In some embodiments, object characterization processor 160, imaging device 162, one or more light sources 176, and other components of system 610 may be located onboard the collection vehicle 605 and function in the same manner as described above. In other embodiments, only a subset of the components of system 610 are located onboard the collection vehicle 605. For example, in one embodiment, the imaging device 162 and one or more optional light sources 176 may be located onboard the collection vehicle 605 while the object characterization processor 160 is located at a central station and is in wireless communication with the imaging device 162 and one or more light sources 176 such as through cellular or Wi-Fi, or other wireless communications technology. In that case, raw image frames from the imaging device 162 may be wirelessly transmitted to the central station for subsequent processing by neural processing units 164. In some embodiments, the raw image frames may instead be locally stored on a non-transient memory device (for example, such as removable memory card or disk) aboard the collection vehicle 605 and transferred to the object characterization processor 160 when the collection vehicle 605 arrived as the central station. In some embodiments, the optical material characterization system 610 may further comprise locally at the collection vehicle 605 at least one user interface device 170 and/or process control electronics 174. For example, in one embodiment in operation, the Collection Vehicle 605 includes a mechanical loading arm 630 with which it lifts a collection bin 632 in order to deposit the contents of the collection bin 632 into the collection vehicle 605. In one embodiment the loading arm 630 transports materials to be collected to a part of the collection vehicle, which may comprise an active or passive conveyance mechanism. In other embodiments, the collection bin 632 may be deposited into the vehicle 605 manually without the aid of a mechanical loading arm 630.

If as (and/or after) the materials enter the collection vehicle 605 the object characterization processor 160 detects an anomaly such as hazardous or other prohibited material, the optical material characterization system 610 may issue a warning or other form of specific instructions to the operator of the collection vehicle 605 via the onboard user interface device 170. Such a warning and/or other specific instructions may be tailored to the specific material identified by the system 610. Moreover, the process control electronics 174 may be used to control Mechanical Loading Arm 630 (or otherwise override local operation). For example, where object characterization processor 160 detects undesirable materials, it may send a control signal to the process control electronics 174, which in turn deactivates continued operation of the Mechanical Loading Arm 630 instead of, or in addition to, outputting a message to the onboard user interface device 170.

Figure 7:
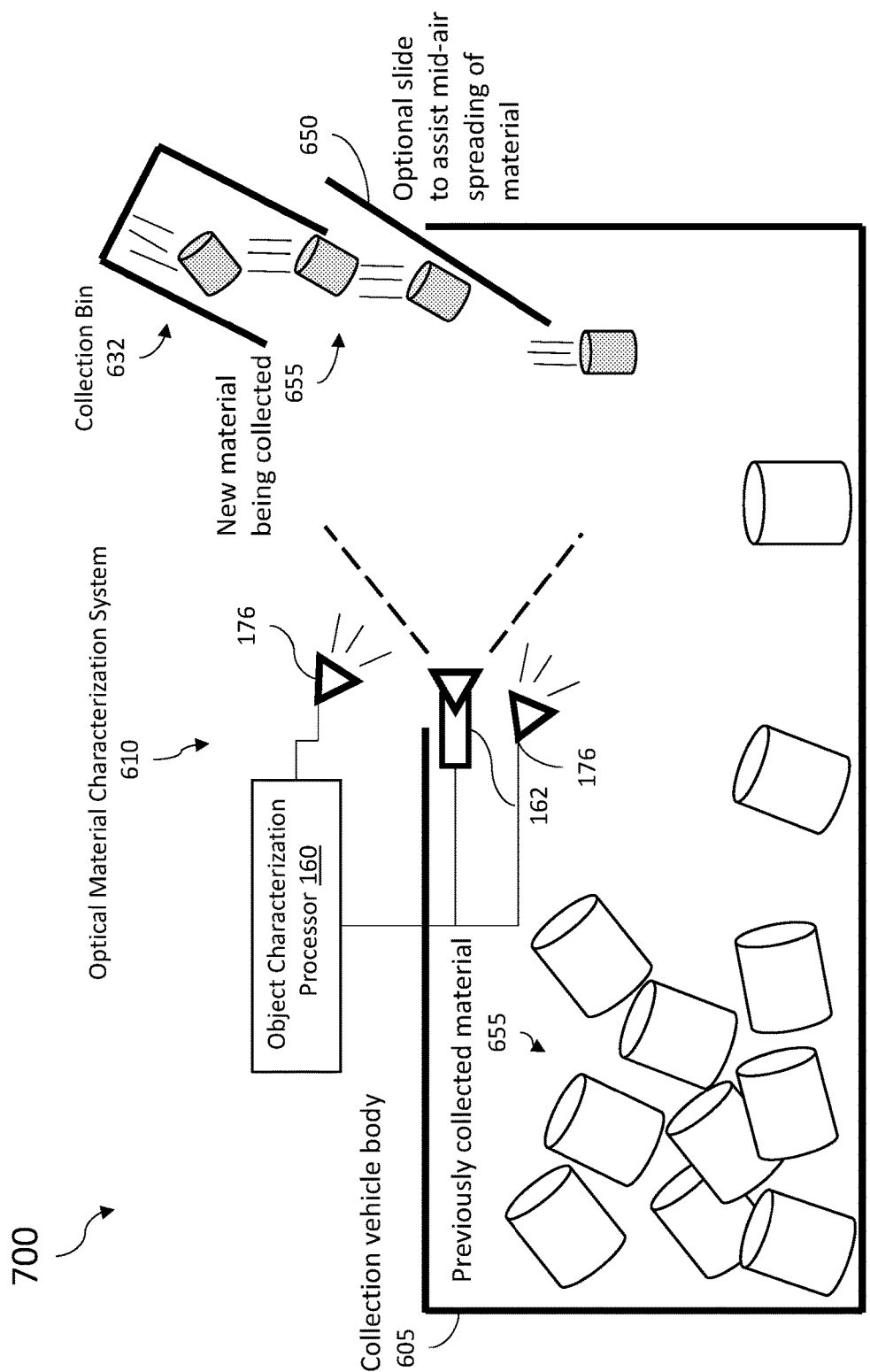
Figure 7A:
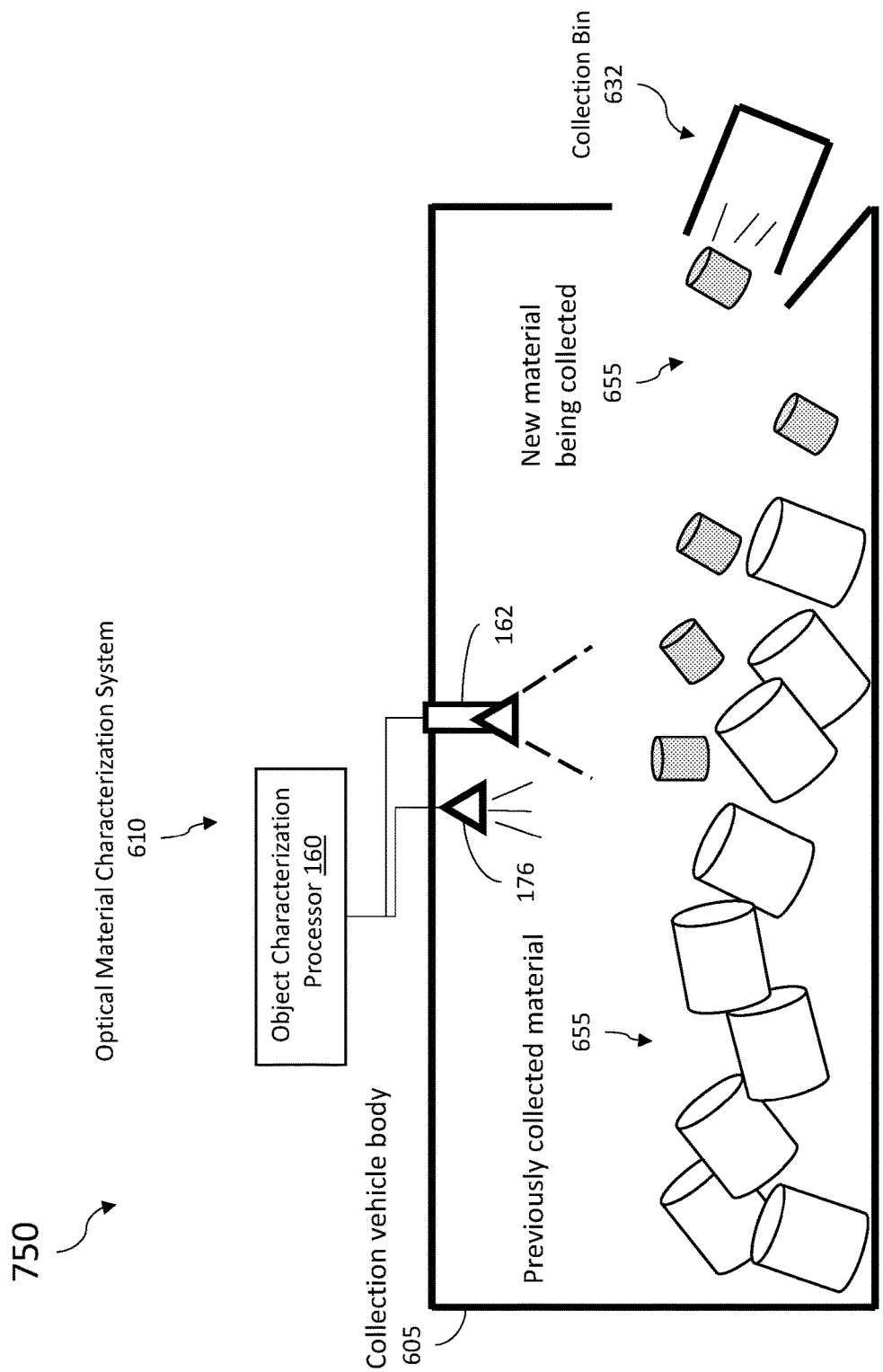

FIG. 7 illustrates at 700 an example embodiment of optical material characterization system 610 in operation where the collection vehicle 605 receives material from collection bin 632 from above. That is, the collected material 655 (which would correspond to the target object 55 discussed above) can be fed (for example, gravity fed) into the collection vehicle 605. In some embodiments, the materials 655 may optionally travel down a conveyance mechanism 650 such as a slide or chute which may further function to spread materials out as they enter the vehicle. Upon entry into the collection vehicle 605, the collected material 655 pass through the field of view of imaging device 162 and are characterized in the same manner described above for system 10. As described above, the imaging device 162 is directed towards the collected material 655 entering the collection vehicle 605 produces an image signal that is delivered to the object characterization processor 160. Within the object characterization processor, these image frames are provided input to one or more neural network and artificial intelligence algorithms (shown as the Neural Processing Units 164) to locate and identify material appearing within the image frames. FIG. 7A illustrates at 750 an another example embodiment of optical material characterization system 610 in operation where the collection vehicle 605 is back or side loaded with material from collection bin 632. The imaging device 162 is directed towards the collected material 655 entering the collection vehicle 605 and produces an image signal that is delivered to the object characterization processor 160. Within the object characterization processor, these image frames are provided input to one or more neural network and artificial intelligence algorithms (shown as the Neural Processing Units 164) to locate and identify material appearing within the image frames.

Figure 8:
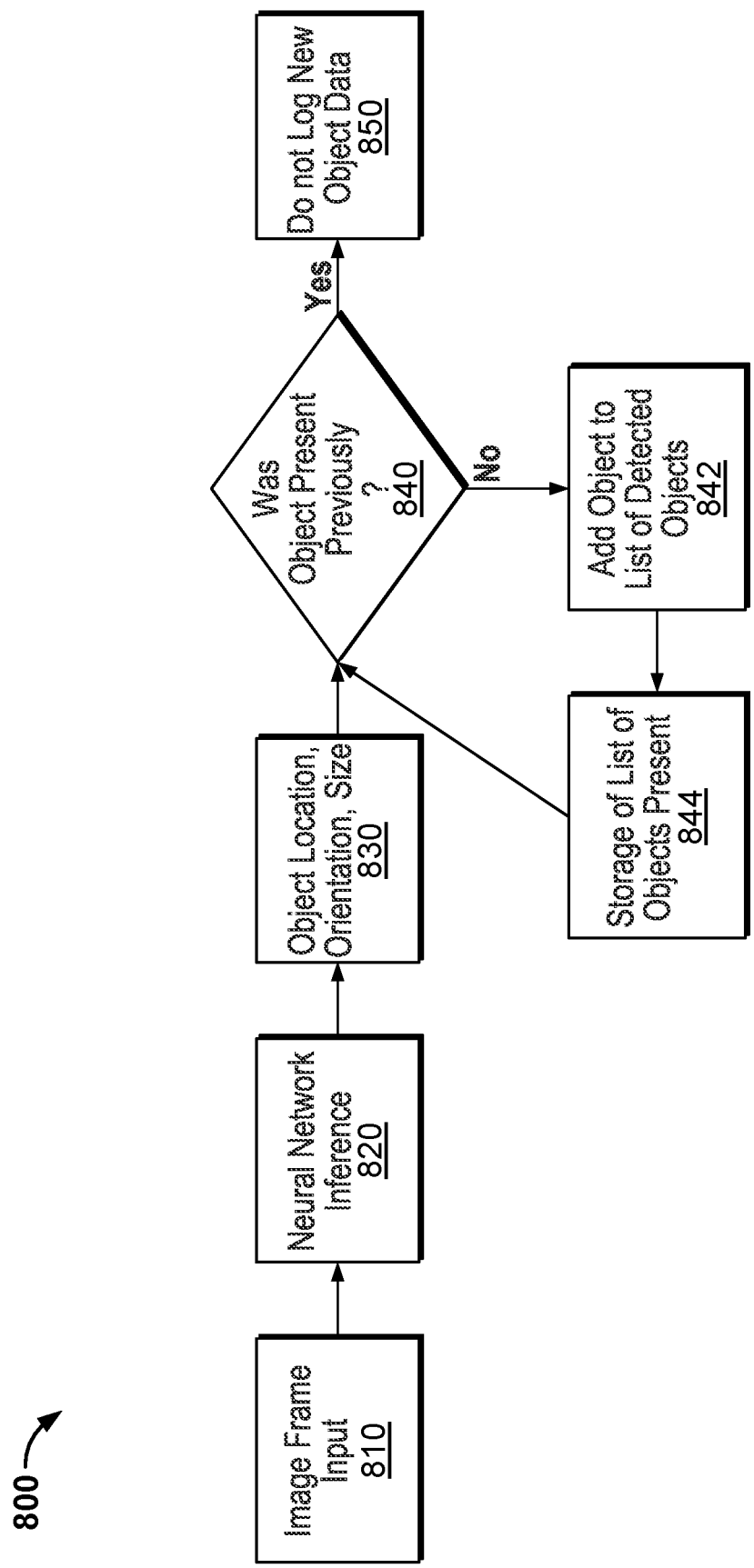
FIG. 8 is a diagram illustrating a process for differentiating newly collected materials from previously collected materials for one embodiment of the present disclosure.

In either of the implementations shown in FIG. 7 or 7A, newly collected material 655 will tend to be deposited over previously collected material 655. As such, as shown in FIG. 8, image frames captured by the imaging device 162 of collected material 655 within the body of collection vehicle 605 (shown at 810) may include a combination of newly collected material 655 and previously collected material 655. These image frames 810 may be fed into the Machine learning inference algorithm 220 of the Neural Processing Units 164 (shown at 820) in order to detect, for example, object material type, location, shape, orientation and size (shown at 830) of the collected material 655 appearing in each frame, in the same manner as described above for system 10. In one embodiment, this information is then processed by the optical material characterization system 610 to determine which of those objects were previously present within the collection vehicle 605, and which are newly present (shown at 840). For example, if there is a high correlation of characteristics (for example object material type, location, shape, orientation and/or size) between an item of collected material 655 appearing in the image frame 810 and a previously identified object from a previously image frame, then that item of collected material 655 is not considered to be a newly collected object (shown at 850). If there is no such correlation, the item of collected material 655 is considered to be a newly collected object. In one embodiment, the material characterization system 610 comprises a memory 844 (for example, Data Storage 166) where a list or catalog of objects collected and characterized by optical material characterization system 610 are stored. Once newly collected objects 655 are characterized, they are added to the list or catalog of objects collected (shown at 842) and from that point forward are considered previously collected objects 655.

Figure 9:
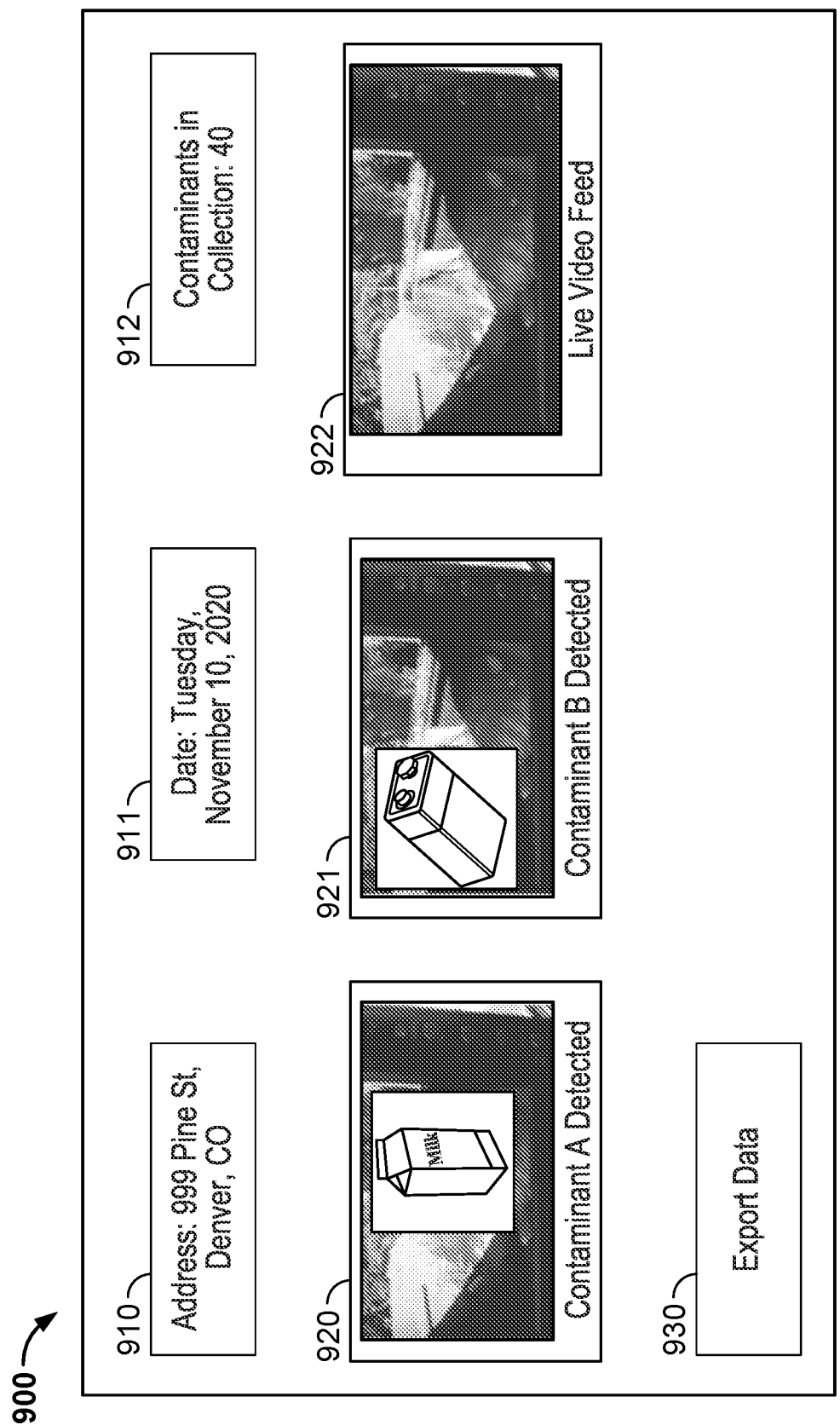
FIG. 9 is a diagram illustrating another example display of material characterization data at a user interface device for one embodiment of the present disclosure.

FIG. 9 is a diagram illustrating generally at 900 another example display of material characterization data at a user interface device for one embodiment of the present disclosure. In one embodiment, this example display of material characterization data is used in combination with the optical material characterization system 610 and may be displayed at a local user interface device 170 located aboard collection vehicle 605, or at a user interface device 170 located remote from collection vehicle 605, such as at a central station, for example. As shown at 910, image frames captured by the optical material characterization system 610 may be further tagged with location information (shown at 910) and time and date information (shown at 920) so that collected objects 655 may be correlated to where and when they were collected. In some embodiments, when am object 655 considered to be a contaminant is collected, such information may be displayed on the user interface device 170 along with optional images of the offending objects (shown at 920 and 921). A count of the number of collected objects considered contaminants may also be displayed (as shown at 912). This information may allow the vehicle operator to locate the contaminant for removal or other mitigation. Moreover, this information may be used to fine customers that place contaminants into the collection bin, or alternatively provide rebates to customers if they recycle "high value" materials. In some embodiments, a live video feed of image frames captured by imaging device 162 may be displayed (shown at 922).

EXAMPLE EMBODIMENTS

Example 1 includes an optical material characterization system, the system comprising: at least one imaging device configured to generate image frames that capture an image of an area and one or more target objects within the area; an object characterization processor coupled to the at least one imaging device and comprising one or more Neural Processing Units and a Neural Network Parameter Set, wherein the Neural Network Parameter Set stores learned parameters utilized by the one or more Neural Processing Units for characterizing the one or more target objects; wherein the one or more Neural Processing Units are configured by the Neural Network Parameter Set to detect a presence of a plurality of different materials within the image frames based on a plurality of different features; and wherein for a first image frame of the plurality of image frames, the one or more Neural Processing Units outputs material characterization data that identifies which of the plurality of different materials are detected in the first image frame.

Example 2 includes the system of example 1, wherein the at least one imaging device is positioned to generate image frames that capture an image of an area of a conveyance mechanism and the one or more target objects are transported by the conveyance mechanism positioned within the area.

Example 3 includes the system of example 2, wherein the conveyance mechanism comprises a conveyor belt, a slide, a chute, an opening through which the one or more target objects are dropped, or a mechanism through which one or more target objects are gravity fed.

Example 4 includes the system of any of examples 2-3, wherein one or both of the at leak one imaging device and the conveyance mechanism are mounted within a vehicle and a loading arm transports materials to the conveyance mechanism.

Example 5 includes the system of any of examples 1-4, wherein the area is located within a collection vehicle.

Example 6 includes the system of example 5, wherein the at least one imaging device is located within the collection vehicle.

Example 7 includes the system of any of examples 5-6, wherein the area includes a part of a collection vehicle that receives the plurality of different materials, and the at least one imaging device is configured to generate image frames of the plurality of different materials received by the part of the collection vehicle.

Example 8 includes the system of any of examples 1-8, wherein the material characterization data further comprises at least one of a location, a shape, a size, and an orientation of at least a first material of the plurality of different materials detected in the first image frame.

Example 9 includes the system of example 8, wherein the one or more Neural Processing Units produce a material specific image (MSI) map illustrating a position for at least the first material within the first image frame.

Example 10 includes the system of example 9, wherein the object characterization processor outputs the MSI map to a sorting robot to identify locations of one or more of the target objects for the sorting robot to capture.

Example 11 includes the system of example 10, wherein the MSI map identifies locations of specific surface areas of the one or more of the target objects having features that present a surface most suitable for gripping by the sorting robot based on features detected by the one or more Neural Processing Units.

Example 12 includes the system of any of examples 1-11, wherein the object characterization processor outputs one or more physical object attributes determined by the one or more Neural Processing Units based on visional inspection of the one or more target objects.

Example 13 includes the system of any of examples 1-12, wherein based on which of the plurality of different materials are detected in the first image frame, the object characterization processor outputs a control signal to control operation of a device external to the optical material characterization system.

Example 14 includes the system of any of examples 1-13, further comprising a Data Storage that stores the image frames received from the imaging device Example 15 includes the system of any of examples 1-14, wherein the material characterization data is either saved to a Data Storage, or communicated to a remote device over a remote network.

Example 16 includes the system of any of examples 1-15, further comprising a user interface device coupled to the object characterization processor, wherein object characterization processor is configured to display the material characterization data, and statistics and other information derived from the material characterization data via the user interface device.

Example 17 includes the system of example 16, wherein the user interface device is communicatively coupled to the object characterization processor via a network.

Example 18 includes the system of any of examples 1-17, wherein based on the material characterization data, the object characterization processor calculates at least one of a total mass, a total market value, or a total available energy, for a least one of the plurality of different materials detected in the first image frame.

Example 19 includes the system of any of examples 1-18, wherein the at least one imaging device comprises at least one of a visual spectrum image sensor, a hyperspectral image sensor, an infrared image sensor, an ultraviolet image sensor, or a magnetic image sensor.

Example 20 includes the system of any of examples 1-19, wherein the object characterization processor is integrated within the at least one imaging device.

Example 21 includes the system of any of examples 1-20, wherein the object characterization processor is coupled to receive the image frames from the at least one imaging device by either a wired or wireless communication link.

Example 22 includes the system of any of examples 1-21, further comprising one or more light sources, wherein the one or more light sources are controlled by object characterization processor to illuminate the target objects within the as the imaging device generates image frames.

Example 23 includes the system of example 22, wherein the one or more light sources are selectively controlled to illuminate the target objects from different angles or using different wavelengths of lights.

Example 24 includes the system of example 23, wherein the one or more light sources provide at least one of visual spectrum, infrared, or ultraviolet light.

Example 25 includes the system of any of examples 23-24, wherein the one or more light sources are selectively controlled by object characterization processor based on materials detected in the area by the one or more Neural Processing Units.

Example 26 includes an object characterization processing system, the system comprising: one or more Neural Processing Units; a Neural Network Parameter Set; wherein the one or more Neural Processing Units receive, from at least one imaging device, image frames each comprising an image of an area; wherein the Neural Network Parameter Set stores learned parameters utilized by the one or more Neural Processing Units for characterizing one or more target objects appearing in the image frames; wherein the one or more Neural Processing Units are configured by the Neural Network Parameter Set to detect a presence of a plurality of different materials within the image frames based on a plurality of different features; wherein based on which of the plurality of different materials are detected in a first image frame by the one or more Neural Processing Units, the object characterization processing system outputs a signal.

Example 27 includes the system of example 26, wherein the area is located within a collection vehicle.

Example 28 includes the system of example 27, wherein the at least one imaging device is located within the collection vehicle.

Example 29 includes the system of any of examples 27-28, wherein the area includes a part of a collection vehicle that receives the plurality of different materials, and the at least one imaging device is configured to generate image frames of the plurality of different materials received by the part of the collection vehicle.

Example 30 includes the system of any of examples 26-29, wherein the signal comprises data describing which of the plurality of different materials are detected in the first image frame and the data is stored to a data storage.

Example 31 includes the system of any of examples 26-30, wherein the signal causes a user interface device to output a display of statistics on material collected.

Example 32 includes the system of any of examples 26-31, wherein the signal causes a user interface device to output a display of a material specific image (MSI) map illustrating a position for where at least a first material of the plurality of different materials are detected.

Example 33 includes the system of any of examples 26-32, wherein based on which of the plurality of different materials are detected in a first image frame by the one or more Neural Processing Units, the object characterization processing system outputs a control signal to control operation of a device external to the optical material characterization system.

Example 34 includes an object characterization method, the method comprising: receiving images frames from at least one imaging device, the image frames each comprising an image of an area; evaluating the image frames using one or more Neural Processing Units to detect a presence of a plurality of different materials within the image frames based on a plurality of different features, wherein the one or more Neural Processing Units are configured by a Neural Network Parameter Set to characterize one or more objects appearing in the image frames; and based on which of the plurality of different materials are detected in a first image frame of the image frames by the one or more Neural Processing Units, outputting a signal.

Example 35 includes the method of example 34, wherein the area is located within a collection vehicle.

Example 36 includes the method of example 35, wherein the at least one imaging device is located within the collection vehicle.

Example 37 includes the method of any of examples 35-36, wherein the area includes a part of a collection vehicle that receives the plurality of different materials, and the at least one imaging device is configured to generate image frames of the plurality of different materials received by the part of the collection vehicle.

Example 38 includes the method of any of examples 34-37, wherein the signal comprises data describing which of the plurality of different materials are detected in the first image frame and the data is stored to a data storage.

Example 39 includes the method of any of examples 34-38, wherein the signal causes a user interface device to output a display of statistics on material collected.

Example 40 includes the method of any of examples 34-39, wherein outputting the signal comprises outputting a control signal to control operation of a device.

Example 41 includes the method of example 40, wherein outputting the signal to control operation of the device comprises adjusting a speed of a conveyance mechanism.

Example 42 includes the method of any of examples 40-41, wherein outputting the signal to control operation of the device comprises outputting a material specific image (MSI) map to identify to the device locations of one or more of the objects for the device to capture.

Example 43 includes the method of any of examples 40-42, wherein outputting the signal to control operation of the device comprises selectively controlling one or more light sources based on characteristics of materials detected in the area by the one or more Neural Processing Units.

In various alternative embodiments, system elements, method steps, or examples described throughout this disclosure (such as the object characterization processor, neural processing units, process control electronics, sorting robots and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated. Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system, the system comprising:
    at least one imaging device configured to generate an image frame of one or more target objects within an area;
    an object characterization processor coupled to the at least one imaging device and comprising one or more Neural Processing Units and a Neural Network Parameter Set, wherein the Neural Network Parameter Set stores learned parameters utilized by the one or more Neural Processing Units for characterizing the one or more target objects, wherein the object characterization processor is configured to:
        detect that a first target object of a first material is present within the image frame;
        detect that a second target object of a second material is present within the image frame;
        generate a first material specific image map corresponding to the first material using the image frame, wherein the first material specific image map indicates where the first target object of the first material exists within the image frame;
        generate a second material specific image map corresponding to the second material using the image frame, wherein the second material specific image map indicates where the second target object of the second material exists within the image frame; and
        output material characterization data, wherein the material characterization data comprises a first detected presence of the first target object of the first material within the image frame, a second detected presence of the second target object of the second material within the image frame, and one or more attributes associated with the first target object and the second target object that are determined based at least in part on the first material specific image map corresponding to the first material and the second material specific image map corresponding to the second material.

2. The system of claim 1, wherein the at least one imaging device is positioned to generate the image frame to capture the area of a conveyance mechanism and wherein the one or more target objects are transported by the conveyance mechanism positioned within the area.

3. The system of claim 2, wherein the conveyance mechanism comprises a conveyor belt, a slide, a chute, an opening through which the one or more target objects are dropped, or a mechanism through which one or more target objects are gravity fed.

4. The system of claim 1, wherein the one or more attributes associated with the first target object comprises at least one of a location, a shape, a size, and an orientation.

5. The system of claim 4, wherein the first material specific image map illustrates a position for at least the first target object.

6. The system of claim 5, wherein the object characterization processor outputs the first material specific image map to a sorting robot to identify locations of one or more of the target objects for the sorting robot to capture.

7. The system of claim 6, wherein the first material specific image map identifies locations of specific surface areas of the one or more of the target objects having features that present a surface most suitable for gripping by the sorting robot based on features detected by the one or more Neural Processing Units.

8. The system of claim 1, wherein the object characterization processor outputs one or more physical object attributes determined by the one or more Neural Processing Units based on visional inspection of the one or more target objects.

9. The system of claim 1, wherein the object characterization processor further outputs a control signal to control operation of a device external to the system.

10. The system of claim 1, further comprising a Data Storage that stores the image frame received from the imaging device.

11. The system of claim 1, wherein the material characterization data is either saved to a Data Storage, or communicated to a remote device over a remote network.

12. The system of claim 1, further comprising a user interface device coupled to the object characterization processor, wherein the object characterization processor is configured to display the material characterization data, statistics, and other information derived from the material characterization data via the user interface device.

13. The system of claim 12, wherein the user interface device is communicatively coupled to the object characterization processor via a network.

14. The system of claim 1, wherein based on the material characterization data, the object characterization processor calculates at least one of a total mass, a total market value, or a total available energy, for at least one of the first material and the second material.

15. The system of claim 1, wherein the at least one imaging device comprises at least one of a visual spectrum image sensor, a hyperspectral image sensor, an infrared image sensor, an ultraviolet image sensor, or a magnetic image sensor.

16. The system of claim 1, wherein the object characterization processor is integrated within the at least one imaging device.

17. The system of claim 1, wherein the object characterization processor is coupled to receive the image frame from the at least one imaging device by either a wired or wireless communication link.

18. The system of claim 1, further comprising one or more light sources, wherein the one or more light sources are controlled by the object characterization processor to illuminate the one or more target objects within the image frame.

19. The system of claim 18, wherein the one or more light sources are selectively controlled to illuminate the one or more target objects from different angles or using different wavelengths of lights.

20. The system of claim 19, wherein the one or more light sources provide at least one of visual spectrum, infrared, or ultraviolet light.

21. The system of claim 19, wherein the one or more light sources are selectively controlled by the object characterization processor based on materials detected in the area by the one or more Neural Processing Units.

22. A system, the system comprising:
one or more Neural Processing Units;
a Neural Network Parameter Set;
wherein the one or more Neural Processing Units receive, from at least one imaging device, an image frame of an area;
wherein the Neural Network Parameter Set stores learned parameters utilized by the one or more Neural Processing Units for characterizing one or more target objects appearing in the image frame;
wherein the one or more Neural Processing Units are configured to:
detect that a first target object of a first material is present within the image frame;
detect that a second target object of a second material is present within the image frame;
generate a first material specific image map corresponding to the first material using the image frame, wherein the first material specific image map indicates where the first target object of the first material exists within the image frame;
generate a second material specific image map corresponding to the second material using the image frame, wherein the second material specific image map indicates where the second target object of the second material exists within the image frame; and
output material characterization data, wherein the material characterization data comprises a first detected presence of the first target object of the first material within the image frame, a second detected presence of the second target object of the second material within the image frame, and one or more attributes associated with the first target object and the second target object that are determined based at least in part on the first material specific image map corresponding to the first material and the second material specific image map corresponding to the second material.

23. The system of claim 22, wherein the material characterization data is stored to a data storage.

24. The system of claim 22, wherein the material characterization data further comprises statistics on material collected and is displayed at a user interface device.

25. The system of claim 22, wherein the first material specific image map illustrates a position for where at least the first target object of the first material is detected.

26. The system of claim 22, wherein the system is further configured to output a control signal to control operation of a device external to the system.

27. An object characterization method, the method comprising:
receiving an image frame from at least one imaging device, the image frame comprising an image of an area;
evaluating the image frame using one or more Neural Processing Units,
including by:
detecting that a first target object of a first material is present within the image frame;
detecting that a second target object of a second material is present within the image frame;
generating a first material specific image map corresponding to the first material using the image frame, wherein the first material specific image map indicates where the first target object of the first material exists within the image frame;
generating a second material specific image map corresponding to the second material using the image frame, wherein the second material specific image map indicates where the second target object of the second material exists within the image frame; and
outputting material characterization data, wherein the material characterization data comprises a first detected presence of the first target object of the first material within the image frame, a second detected presence of the second target object of the second material within the image frame, and one or more attributes associated with the first target object and the second target object that are determined based at least in part on the first material specific image map corresponding to the first material and the second material specific image map corresponding to the second material.

28. The method of claim 27, wherein the material characterization data is stored to a data storage.

29. The method of claim 27, wherein the material characterization data further comprises statistics on material collected and is displayed at a user interface device.

30. The method of claim 27, further comprising outputting a control signal to control operation of a device.

31. The method of claim 30, wherein outputting the control signal to control operation of the device comprises adjusting a speed of a conveyance mechanism.

32. The method of claim 30, wherein outputting the control signal to control operation of the device comprises outputting the first material specific image map to identify to the device, locations of one or more of the one or more target objects for the device to capture.

33. The method of claim 30, wherein outputting the control signal to control operation of the device comprises selectively controlling one or more light sources based on characteristics of materials detected in the area by the one or more Neural Processing Units.

* * * * *

UNITED STATES PATENT AND TRADEMARK OFFICE
CERTIFICATE OF CORRECTION

PATENT NO. : 11,069,053 B2  
APPLICATION NO. : 16/177137  
DATED : July 20, 2021  
INVENTOR(S) : Matanya B. Horowitz and James A. Bailey It is certified that error appears in the above-identified patent and that said Letters Patent is hereby corrected as shown below:

In the Specification

In Column 5, Line(s) 16, delete "chmaterial" and insert --material--, therefor.
In Column 8, Line(s) 38, delete "Fluang et al.," and insert --Huang et al.,--, therefor.

Signed and Sealed this
Eleventh Day of January, 2022

Drew Hirshfeld
*Performing the Functions and Duties of the
Under Secretary of Commerce for Intellectual Property and
Director of the United States Patent and Trademark Office*